(12) United States Patent
Ozeki

(10) Patent No.: US 9,243,618 B2
(45) Date of Patent: Jan. 26, 2016

(54) PUMP DEVICE FOR LUBRICANT

(75) Inventor: Noboru Ozeki, Tokyo (JP)

(73) Assignee: LUBE CO., LTD., Tokyo (JP)

( * ) Notice: Subject to any disclaimer, the term of this patent is extended or adjusted under 35 U.S.C. 154(b) by 759 days.

(21) Appl. No.: 13/579,428

(22) PCT Filed: Feb. 19, 2010

(86) PCT No.: PCT/JP2010/001093
§ 371 (c)(1),
(2), (4) Date: Sep. 17, 2012

(87) PCT Pub. No.: WO2011/101914
PCT Pub. Date: Aug. 25, 2011

(65) Prior Publication Data
US 2013/0034458 A1   Feb. 7, 2013

(51) Int. Cl.
*F04B 7/04* (2006.01)
*F04B 23/02* (2006.01)
*F16N 13/02* (2006.01)
*F16N 13/06* (2006.01)

(52) U.S. Cl.
CPC .............. *F04B 23/025* (2013.01); *F04B 7/04* (2013.01); *F16N 13/02* (2013.01); *F16N 13/06* (2013.01)

(58) Field of Classification Search
CPC .......... F04B 23/025; F04B 7/04; F16N 13/02; F16N 13/06; F16N 2013/06; B29C 45/83
USPC .................... 417/53, 63, 410.1, 498
See application file for complete search history.

(56) References Cited

U.S. PATENT DOCUMENTS 1,829,042 A * 10/1931 Hallerberg ............... 184/28
5,228,469 A * 7/1993 Otten et al. ............... 137/80
5,524,030 A * 6/1996 White et al. ............. 376/260
6,484,847 B2  11/2002 Paczuski (Continued)

FOREIGN PATENT DOCUMENTS

CN       2371541 Y    3/2000
CN     201277016 Y    7/2009
EP      1253368 A2 * 10/2002 ............ F16N 7/38

(Continued)

OTHER PUBLICATIONS

WIPO, "International Preliminary Report on Patentability" for PCT/JP2010/001093, Sep. 18, 2012.

(Continued)

*Primary Examiner* — Peter J Bertheaud
*Assistant Examiner* — Dominick L Plakkoottam
(74) *Attorney, Agent, or Firm* — Manabu Kanesaka

(57) ABSTRACT

A pump device for lubricant includes a pump main body; a cylinder part having an introduction port and a derivation port; a piston moving within the cylinder part; an actuator moving the piston forward to a 1st position to discharge a lubricant from the derivation port, backward from the 1st position to a 2nd position to suction the lubricant from the introduction port and further backward from the 2nd position to a 3rd position to stop the suction and discharge of the lubricant; and a driving control device controlling the actuator such that when the lubricant is supplied, the piston is moved from the 3rd position to the 1st position and moved between the 1st position and the 2nd position, and when the lubricant is not supplied, the piston is moved to the 3rd position and stopped.

6 Claims, 8 Drawing Sheets

(56) References Cited

U.S. PATENT DOCUMENTS

2008/0011113 A1* 1/2008 Safran et al. .............. 74/89.17
2009/0242161 A1* 10/2009 Uchida et al. .............. 164/113

FOREIGN PATENT DOCUMENTS

| JP | 34-16757 Y1 | 10/1959 |
| JP | 58-109796 A | 6/1983 |
| JP | 1985-34511 U | 3/1985 |
| JP | 1992-18320 U | 2/1992 |
| JP | 4-121463 A | 4/1992 |
| JP | 6-137489 A | 5/1994 |
| JP | 7-81676 B2 | 9/1995 |
| JP | 2005-282825 A | 10/2005 |
| JP | 4272876 B2 | 6/2009 |
| TW | 513530 B | 12/2002 |
| WO | WO 2007/147356 A1 | 12/2007 |

OTHER PUBLICATIONS

China Patent Office, "Office Action for CN 201080062846.8," Dec. 10, 2014.
Taiwan Patent Office, "Office Action for 099105619," Dec. 17, 2014.
China Patent Office, "Office Action for CN 201080062846.8," Apr. 3, 2014.

* cited by examiner

Prior Art

PUMP DEVICE FOR LUBRICANT

RELATED APPLICATIONS

The present application is National Phase of International Application No. PCT/JP2010/001093 filed Feb. 19, 2010.

TECHNICAL FIELD

The invention relates to a pump device for lubricant which supplies lubricant such as grease and oil or the like to various machines such as an injection molding machine and a lathe or the like. In particular, the invention relates to a pump device for lubricant which is effective for a lubrication pipeline, is provided in a machine and conducts compression and decompression alternately.

BACKGROUND ART

Generally, as shown in FIG. 8, an injection molding machine for a resin or a metal has the following configuration. That is, a single piston which discharges lubricant by back-and-forth movement caused by compression and decompression of lubricant and a known single continuous flow valve V provided with one discharge port corresponding to this piston and discharge about 0.03 ml to 1.5 ml per shot are used, and these continuous flow valves V are provided at corresponding plural locations through a lubrication pipeline W, and lubricant is supplied from a lubricant pump device Sa to this lubrication pipeline W.

Since it discharges lubricant when actuated by compression and decompression of lubricant, the single continuous flow valve V is required to be decompressed. Accordingly, a lubricant pump Sa which can conduct decompression is used.

Conventionally, as the lubricant pump of this type, a device which supplies lubricant made of grease disclosed in Patent Document 1 (JP-A-H06-137489) or Patent Document 2 (JP-B-H07-81676) is known.

This lubricant pump Sa is, as shown in FIG. 8, a plunger-type pump main body 100 provided with a cylinder and a piston and an electric motor 101 as the actuator which allows the piston to move back and forth and can rotate clockwise and counterclockwise.

This pump main body 100 is driven when the electric motor 101 rotates clockwise, and suctions lubricant stored in a tank 102 and discharges it from a discharge port 104 through a discharge path 103. Between the tank 102 and the discharge path 103, a decompression path 105 is formed. In this decompression path 105, a decompression valve 106 which is driven by the electric motor 101 is interposed. The decompression valve 106 is closed when the electric motor 101 rotates clockwise, and opens when the electric motor 101 rotates counterclockwise. When the discharge port 104 is connected with the lubrication pipeline W, and at the time when lubricant is supplied to this lubrication pipeline W, the electric motor 101 is allowed to rotate clockwise to allow the piston of the pump main body 100 to move back and forth to compress the discharge port 104. On the other hand, at the time when lubricant to the lubrication pipeline W is not supplied, based on signals from a pressure switch 107 or the like, the electric motor 101 is allowed to rotate counterclockwise to open a decompression valve 106, whereby the discharge port is decompressed. In FIG. 8, numeral 108 is a relief valve.

Related Art Documents

Patent Documents

Patent Document 1: JP-A-H06-137489
Patent Document 2: JP-B-H07-81676

SUMMARY OF THE INVENTION

Subject to be Solved by the Invention

However, in the above-mentioned conventional lubricant pump Sa, a single electric motor 101 drives the piston of the pump main body 100 and actuates a decompression valve 106. The conventional pump device is efficient in this regard.

However, there is a problem that, since the decompression valve 106 is provided separately from the cylinder and the piston of the pump main body 100, the size of the device is increased for accommodating the decompression valve 106, and the driving mechanism of the decompression valve 106 becomes complicated.

The invention has been made in view of the above-mentioned problems. An object of the invention is to provide a lubricant pump device having a simplified decompression structure to downsize the device, whereby the cost is reduced.

Means for Solving the Subject

In order to attain this object, the pump device for lubricant of the invention comprises a pump main body which is provided with a cylinder part which suctions lubricant stored in a tank and discharges it from a discharge port and a piston which allows the cylinder part to move forward and backward and an actuator which allows the piston to move forward and backward, in which when lubricant is supplied to a lubrication pipeline connected to the discharge port, the discharge port is compressed, and when the supply of lubricant to the lubrication pipeline is stopped, the discharge port is decompressed, wherein the piston is allowed to move forward to the $1^{st}$ position at which lubricant.is discharged, move backward from the $1^{st}$ position to the $2^{nd}$ position at which lubricant is suctioned and further move backward from the $2^{nd}$ position to the $3^{rd}$ position, and in the pump main body, a decompression path which is blocked when the piston is allowed to move between the $1^{st}$ position and the $2^{nd}$ position, and is opened when the piston is moved backward to the $3^{rd}$ position is formed.

Due to such a configuration, at the time of supplying lubricant to a lubrication pipeline connected to the discharge port of the pump main body, the piston is allowed to move from the $3^{rd}$ position to the $1^{st}$ position by means of the actuator. Thereafter, after the piston reaches the $1^{st}$ position, the piston is allowed to move backward. Next, when the piston reaches the $2^{nd}$ position, the piston is allowed to move forward again. When it reaches the $1^{st}$ position again, the piston is allowed to move backward. The piston is allowed to move forward when it reaches the $2^{nd}$ position. In this way, the piston moves back and forth between the $1^{st}$ position and the $2^{nd}$ position. In this case, the decompression path is blocked by the piston. Therefore, due to the back-and-forth movement of the piston, lubricant stored in the tank is suctioned by the piston and is discharged from the discharge port, and then supplied to the lubrication pipeline. Due to this supply of the lubricant, the lubricant is discharged from a valve provided in the lubrication pipeline, whereby oil supply is conducted. When the lubricant is discharged from the valve, the piston is allowed to move backward to the $3^{rd}$ position by means of the actuator, and then stop. In this case, since the decompression path is opened by means of the piston, the discharge port is decompressed, whereby the lubrication pipeline can become ready for the subsequent oil supply.

According to the device of the invention, supply of lubricant and decompression at the time when the supply of lubricant is stopped can be conducted only by back-and-forth movement of the piston by the actuator. Therefore, the cylinder part and the piston which suctions and discharges lubricant serve as a decompression valve. As a result, there is no need to provide a decompression valve separately. In addition, a driving mechanism may be a simple mechanism which allows the piston to move forward and backward by means of the actuator. Therefore, the structure is simple, and as a result, the device can be downsized, leading to a reduction, in cost.

More specifically, the pump device of the invention comprises a block-shaped pump main body provided with a suction path which suctions lubricant stored in a tank from a suction port and a discharge path which discharges the suctioned lubricant from a discharge port, a cylinder part provided with an introduction port which is formed in the pump main body and is intercommunicated with the suction path and introduces lubricant from the suction path and a derivation port which is intercommunicated with the discharge path and derivates lubricant to the discharge path, a piston which is inserted into the cylinder part such that it can move forward and backward and suctions lubricant from the introduction port when it moves backward and discharges lubricant from the derivation port when it moves forward, and an actuator which allows the piston to move forward and backward, in which when lubricant is supplied from the discharge port to a lubrication pipeline connected to the discharge port, the discharge port is compressed, and when the supply of lubricant to the lubrication pipeline is stopped, the discharge port is decompressed, wherein the piston is allowed to move forward to the $1^{st}$ position at which lubricant is discharged, move backward from the $1^{st}$ position to the $2^{nd}$ position at which lubricant is suctioned and further move backward from the $2^{nd}$ position to the $3^{rd}$ position, in the cylinder part of the pump main body, a $1^{st}$ opening and a $2^{nd}$ opening which are blocked when the piston moves between the $1^{st}$ position and the $2^{nd}$ position and is opened when the piston is allowed to move back to the $3^{rd}$ position are formed, in the pump main body, a $1^{st}$ path which connects the $1^{st}$ opening and the discharge path and a $2^{nd}$ path which connects the $2^{nd}$ opening and the suction path and a decompression path which reaches the suction path after passing the discharge path, the $1^{st}$ path, the cylinder part and the $2^{nd}$ path when the piston is allowed to move backward to the $3^{rd}$ position are formed.

According to need, the device further comprises driving control means which drives and controls the actuator such that when the lubricant is supplied, the piston is allowed to move from the $3^{rd}$ position to the $1^{st}$ position and allowed to move between the $1^{st}$ position and the $2^{nd}$ position, and when the lubricant is not supplied, the piston is allowed to move to the $3^{rd}$ position and stops. Due to the presence of the driving control means, compression and decompression can be conducted automatically.

According to need, the device further comprises the $1^{st}$ detection part which detects that the piston is positioned at the $1^{st}$ position, the $2^{nd}$ detection part which detects that the piston is positioned at the $2^{nd}$ position and the $3^{rd}$ detection part which detects that the piston is positioned at the $3^{rd}$ position, wherein the driving control means drives and controls the actuator based on start command signals, detection signals from the $1^{st}$ detection part, the $2^{nd}$ detection part and the $3^{rd}$ detection part and stop command signals. Since the back-and-forth movement of the piston is controlled by detecting the position of the piston, operation can be conducted without fail.

In this case, the control of the actuator by means of the driving control means is effectively a control which allows the piston to move forward when start command signals are output, allows the piston to move backward based on the detection by the $1^{st}$ detection part, allows the piston to move forward based on the detection by the $2^{nd}$ detection part, allows the piston to move back and forth between the $1^{st}$ position and the $2^{nd}$ position until stop command signals are output, allows the piston to move backward to the $3^{rd}$ position when stop command signals are output, and allows the piston to stop based on the detection by the $3^{rd}$ detection part.

Further, according to need, the $1^{st}$ detection part, the $2^{nd}$ detection part and the $3^{rd}$ detection part are each formed of a hall device which detects a magnet provided on the side of the piston. A detection mechanism can be configured by a simple means, which results in simplification of the structure.

Further, according to need, the actuator comprises an electric motor which can rotate clockwise and counterclockwise, a screw shaft which is allowed to rotate clockwise or counterclockwise by the electric motor and a linking member which is screwed to the screw shaft and is linked to the piston and moves forward and backward by the clockwise or counterclockwise rotation of the screw shaft to allow the piston to move forward and backward. Since the piston is forcibly moved through the connecting member by the screw shaft, the piston can be operated without fail. As a result, supply of lubricant can be surely conducted without being adversely affected by a change in viscosity of lubricant.

If the actuator is configured to be provided with an electric motor which can rotate clockwise and counterclockwise, it is effective that the device has the following configuration. That is, it further comprises a $1^{st}$ detection part which detects that the piston is positioned at the $1^{st}$ position, a $2^{nd}$ detection part which detects that the piston is positioned at the $2^{nd}$ position, and a $3^{rd}$ detection part which detects that the piston is positioned at the $3^{rd}$ position, the control of the actuator by the driving control means is a control which allows the electric motor to rotate clockwise to move the piston forward when start command signals are output, allows the electric motor to stop for a prescribed period of stopping time when the $1^{st}$ detection part detects, after the lapse of the prescribed period of stopping time, allows the electric motor to rotate counterclockwise to move the piston backward, allows the electric motor to stop for a prescribed period of time when the $2^{nd}$ detection part detects, allows the electric motor to rotate clockwise to move the piston to forward after the lapse of the prescribed period of stopping time, allows the electric motor to stop for a prescribed period of stopping time based on the detection of the $1^{st}$ detection part and the $2^{nd}$ detection part until stop command signals are output, and thereafter allows the electric motor to rotate clockwise or counterclockwise to allow the piston move back and forth between the $1^{st}$ position and the $2^{nd}$ position, when stop command signals are output, the electric motor is allowed to rotate counterclockwise to allow the piston to move backward to the $3^{rd}$ position, and allows the piston to stop based on the detection of the $3^{rd}$ detection part.

Due to such a configuration, when the rotation of the electric motor is switched between the clockwise rotation and the counterclockwise rotation, the electric motor is stopped for a prescribed stopping time (0.1 to 1.0 second, for example). As a result, switching of rotation is not conducted suddenly, load imposed on the motor is decreased, whereby the service life thereof can be significantly prolonged.

Further, according to need, an introduction port and a derivation port of the cylinder part are formed at the front end part of the cylinder, and an inlet check valve which permits only suction is provided at the front side of the introduction port and an outlet check valve which permits only discharge is provided at the rear side of the derivation port. As compared with the case where the introduction port is provided in the middle of the cylinder part, a negative pressure generated by pulling of the piston immediately acts on the introduction port, and hence, suction of lubricant can be conducted smoothly without being affected by a change in viscosity of lubricant.

Advantageous Effects of the Invention

According to the invention, the piston is allowed to move forward to the $1^{st}$ position at which lubricant is discharged, move backward from the $1^{st}$ position to the $2^{nd}$ position at which lubricant is suctioned and further move backward to the $3^{rd}$ position. In the pump main body, a decompression path which is blocked by the piston when the piston is allowed to move between the $2^{nd}$ position and the $3^{rd}$ position, and is opened by the piston when the piston is allowed to move backward to the $3^{rd}$ position is formed. Accordingly, only by the back-and-forth movement of the piston by the actuator, supply of lubricant and decompression during the period when supply is stopped can be conducted. Therefore, the cylinder part which suctions and discharges lubricant and the piston serve as a decompression valve. Therefore, it is not necessary to provide a decompression valve separately unlike the conventional pump devices. Further, since a driving mechanism may be a simple mechanism in which the piston is moved forward and backward by the actuator, the structure is simple. As a result, the device can be downsized and the cost can be reduced.

BRIEF DESCRIPTION OF THE DRAWINGS

FIG. 2 (b) is a front cross-sectional view of essential parts;

MODE FOR CARRYING OUT THE INVENTION

Hereinbelow, based on the attached drawings, the pump device for lubricant according to the embodiment of the invention will be described in detail.

Figure 1:
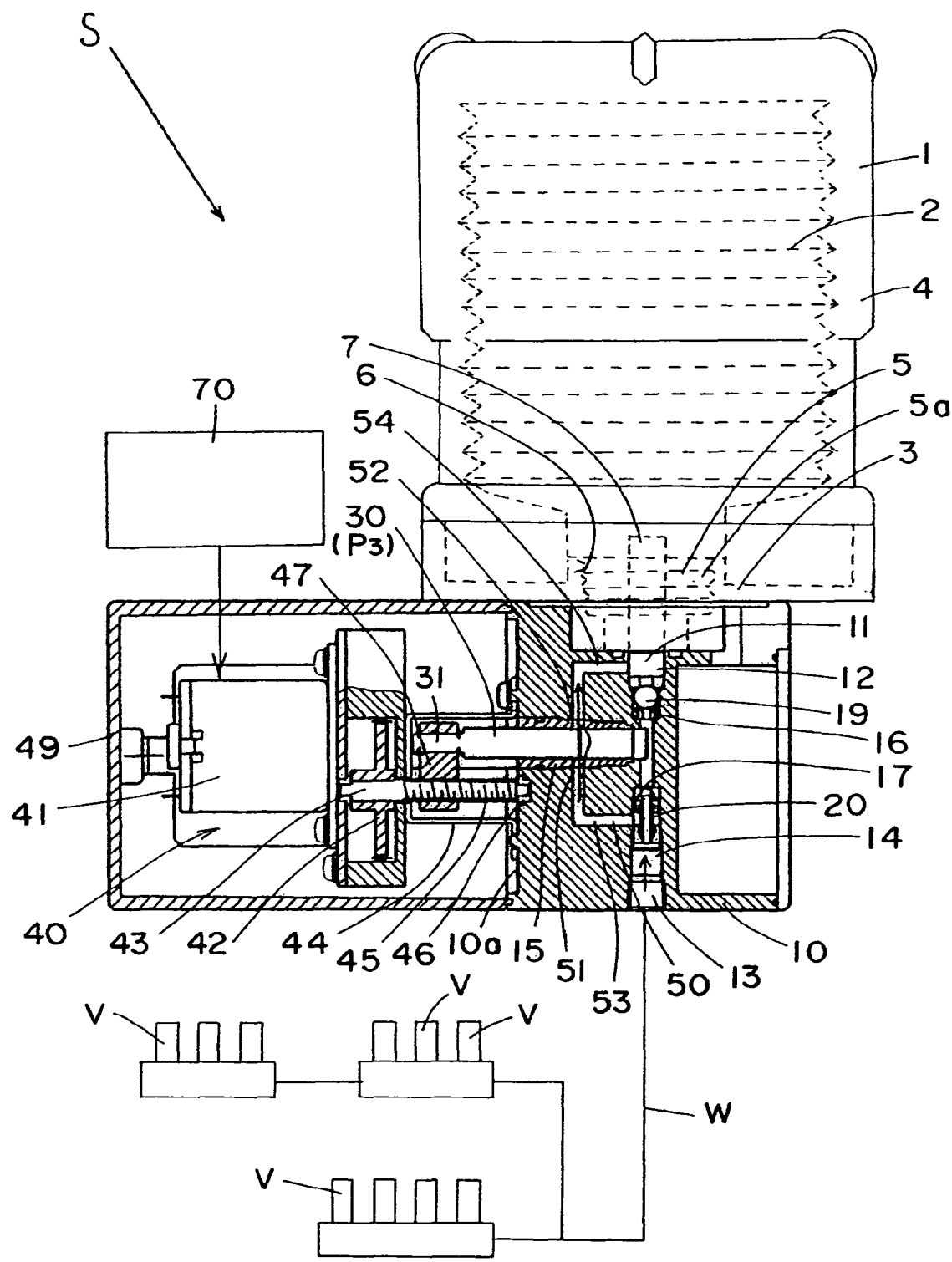
FIG. 1 is a front cross-sectional view of the pump device for lubricant according to the embodiment of the invention.
Figure 2:
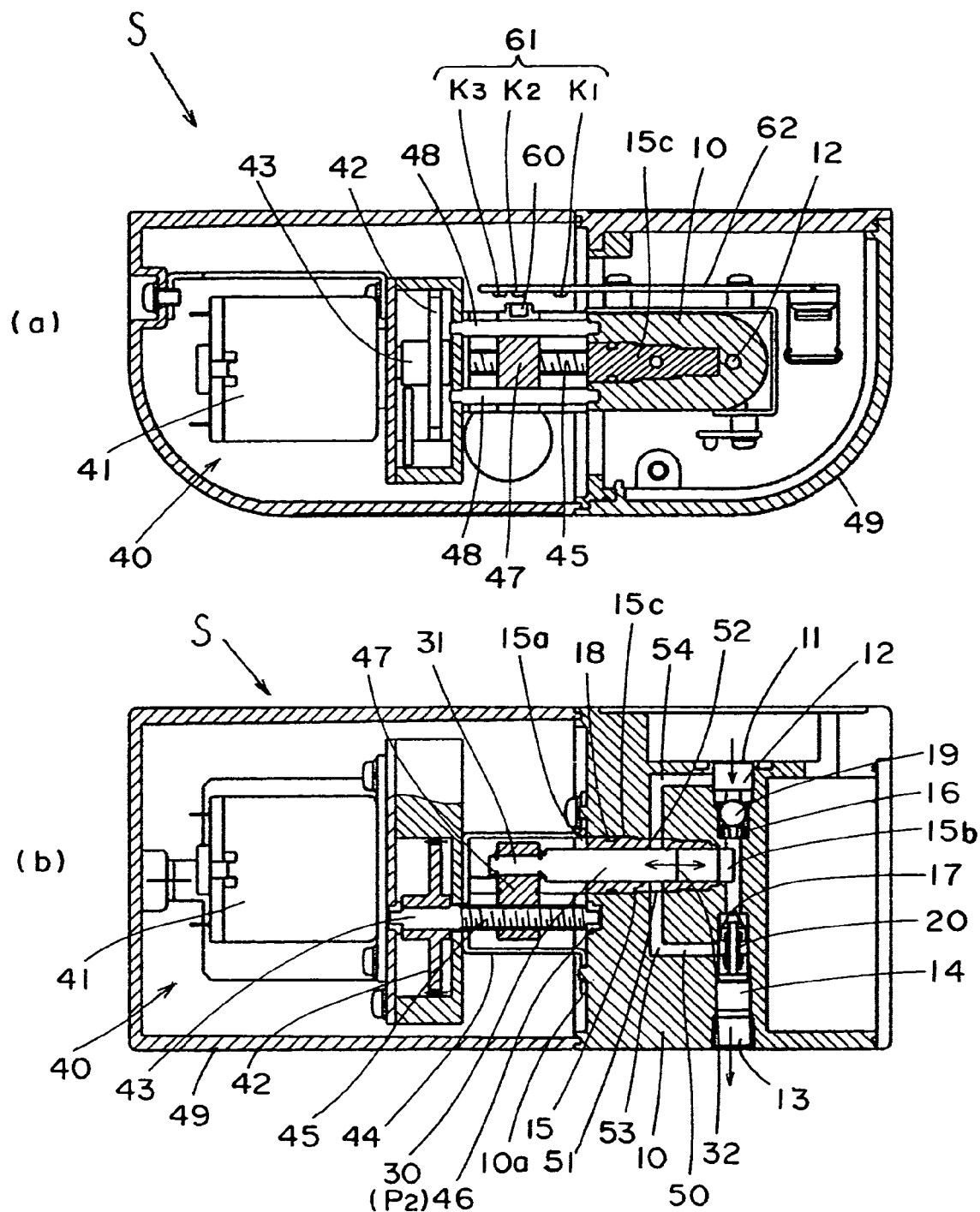
FIGS. 2 (a), (b) are views showing a pump device for lubricant according to the embodiment of the invention, in which FIG. 2 (a) is a top cross-sectional view of essential parts.

The pump device for lubricant according to the Examples of the invention is provided in a lubrication system of an injection molding machine for a resin or a metal, for example. In this lubrication system, as shown in FIG. 1, a plurality of known single continuous flow valves V are arranged at a plurality of necessary parts of an injection molding machine through the lubrication pipeline W, whereby lubricant is supplied from the pump device for lubricant according to the embodiment to this lubrication pipeline W. The single continuous flow valve V is provided with a single piston (not shown) which discharges lubricant due to the back-and-forth movement thereof by compression and decompression of lubricant and a single discharge port corresponding to this piston, and discharges about 0.03 ml to 1.5 ml of oil per shot As shown in FIG. 1 and FIGS. 2 (a), (b), the pump device S for lubricant according to the Examples is basically formed of a lubricant storing part 1, a metal-made block-shaped pump main body 10, an actuator 40 and a control part 70.

As shown in FIG. 1, the lubricant storing part 1 is provided with a tank 2 for accommodating lubricant formed of grease, a tank-installation part 3 which is provided on the upper side of the pump main body 10 and on which the tank 2 is attached, and a cover 4 provided on the tank-installation part 3 and covers the tank 2. The tank 2 is a resin-made cartridge apparatus which is shrinkable in the axial direction, and a male screw 5a is formed in an opening 5. The tank-installation part 3 is provided with a female screw part 6 to which the male screw 5a of the opening 5 of the tank 2 is screwed. Further, the tank-installation part 3 is provided with a guide tube 7 which is inserted into the inside the pump through the opening 5 of the tank 2 which is provided by screwing into the female screw part 6 and introduces lubricant in the tank 2 to a suction port 11 of the pump main body 10, mentioned later.

As shown in FIGS. 1 to 4, the pump main body 10 is provided with a suction path 12 which suctions lubricant stored in the tank 2 from the suction port 11, and a discharge path 14 which discharges lubricant which has been suctioned from a discharge port 13. The suction port 11 is opened on the upper side of the pump main body 10, and is intercommunicated with the above-mentioned guide tube 7. Further, the discharge port 13 is opened at the lower side part surface of the pump main body 10. The lubrication pipeline W is connected to the discharge port 13.

In the pump main body 10, a base part 15a is provided on one side surface 10a of the pump main body 10, and a cylinder part 15 having an axial line in the lateral direction is provided. At a front end part 15b of the cylinder part 15, an introduction port 16 which is intercommunicated with the suction path 12 and introduces lubricant from this suction path 12 and a derivation port 17 which is intercommunicated with the discharge path 14 and derivates lubricant to this discharge path 14. A main body 15c which constitutes the cylinder part 15 is formed of a cylindrical member, and is fitted to a hole 18 formed in the pump main body 10.

At the front side of the introduction port 16, an inlet check valve 19 which only permits suction is provided, and at the rear side of the derivation port 17, an outlet check valve 20 which only permits discharge is provided.

Figure 4:
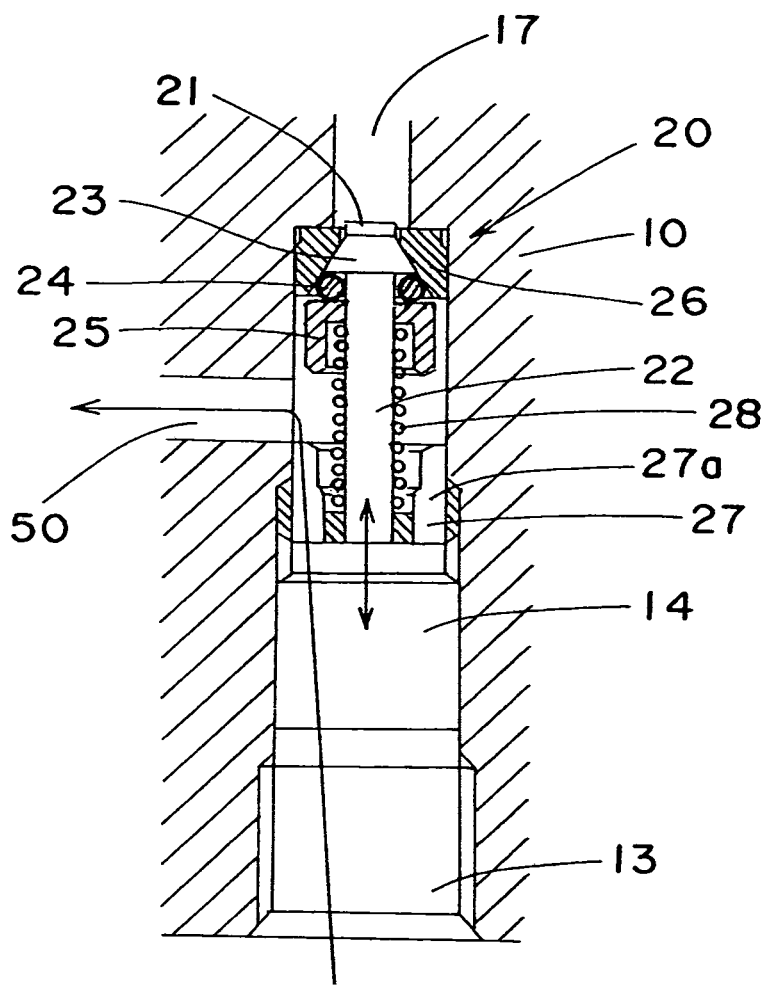
FIG. 4 is an enlarged cross-sectional view showing the structure of an outlet check valve together with the configuration of the discharge path and the decompression path in the pump device for lubricant according to the embodiment of the invention.

As shown in FIG. 4, the outlet check valve 20 is provided with a valve body 21. The valve body 21 is provided with a conical metal head 23 formed at the front part of a rod 22, a rubber-made O-ring 24 which is continuously provided at the base end of the head 23 and is fitted by insertion to the rod 22, and a pressing member 25 which presses the O-ring 24 against the base end of the head 23. The outlet check valve 20 is a metal seal surface part 26 which is provided on the derivation port 17 side of the cylinder part 15 and to which the head 23 and the O-ring 24 of the valve body 21 abut and is spaced apart, a guide part 27 which supports the rod 22 of the valve body 21 such that it can move in the axial direction and a slot-like passage 27a which allows lubricant discharged from the derivation port 17 to be passed when the head 23 and the O-ring 24 are spaced apart from the seal surface part 26, and a coil spring 28 which is provided between the guide part 27 and the pressing member 25 and presses the head 23 and the O-ring 24 against the seal surface part 26.

According to this outlet check valve 20, since the metal-made head 23 and the rubber-made O-ring 24 abut the seal surface part 26, in addition to the connection of the metals, i.e. connection of the head 23 and the seal surface part 26, connection of the rubber-made O-ring 24 and the metal-made seal surface part 26 is attained, whereby sealing can be ensured, and as a result, at the time of suction of lubricant from the derivation port 16, flowing back of the oil can be prevented without fail, resulting in smooth operation.

A piston 30 is inserted into the cylinder part 15 such that it can move forward and backward. The piston 30 suctions lubricant from the introduction port 16 when it moves backward and discharges lubricant from the deviation port 17 when it moves forward. The rear side part 31 of the piston 30 protrudes to the outside from the base end 15a of the cylinder part 15 (that is, one side surface 10a of the pump main body 10) even when the piston 30 moves forward, and then is engaged with an actuator 40.

As shown in FIGS. 1 and 2, the actuator 40 allows the piston 30 to move forward and backward. When the piston is allowed to move backward, it introduces lubricant from the introduction port 16 of the cylinder part 15, and, when the piston is allowed to move forward, it derivates lubricant from the derivation port 17 of the cylinder part 15. Specifically, the actuator 40 is provided with an electric motor 41 which can rotate clockwise and counterclockwise. The electric motor 41 has a driving shaft 43 which is allowed to rotate through a reduction gear mechanism 42, and is fixed to the leg part 44 which is vertically arranged on one side surface 10a of the main pump body 10 such that the axial line of this driving shaft 43 is in parallel with the axial line of the piston 30. To the driving shaft 43 of the electric motor 41, a coaxial screw shaft 45 is provided in an extended manner. The front end part of the screw shaft 45 is rotatably supported by one side surface 10a of the pump main body 10 through a bearing 46. Further, the actuator 40 is screwed to a screw shaft 45, and is provided with a linking member 47 which is fixed to and linked with a rear side part 31 of the piston 30. The linking member 47 is slidably supported by two guide shafts 48, and is allowed to move forward and backward due to the clockwise and counterclockwise rotation of the screw shaft 45 to cause the piston 30 to move forward and backward. By this back-and-forth movement of the piston 30, lubricant is supplied to the lubrication pipeline W which is connected with the discharge port 13, and the discharge port 13 is pressured at the time of supplying lubricant. In the figure, numeral 49 indicates a cover that covers the pump main body 10 and the actuator 40.

Figure 3:
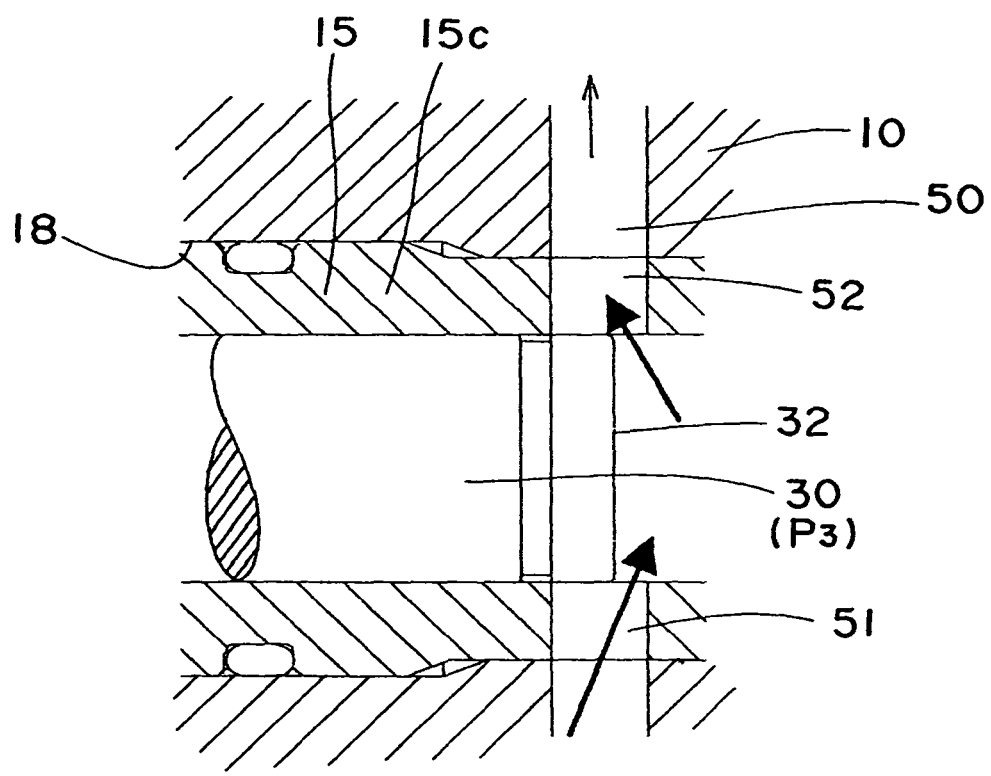
FIG. 3 is a cross-sectional view showing the structure of the decompression path formed in the cylinder part of the pump device for lubricant according to the embodiment of the invention.
Figure 6:
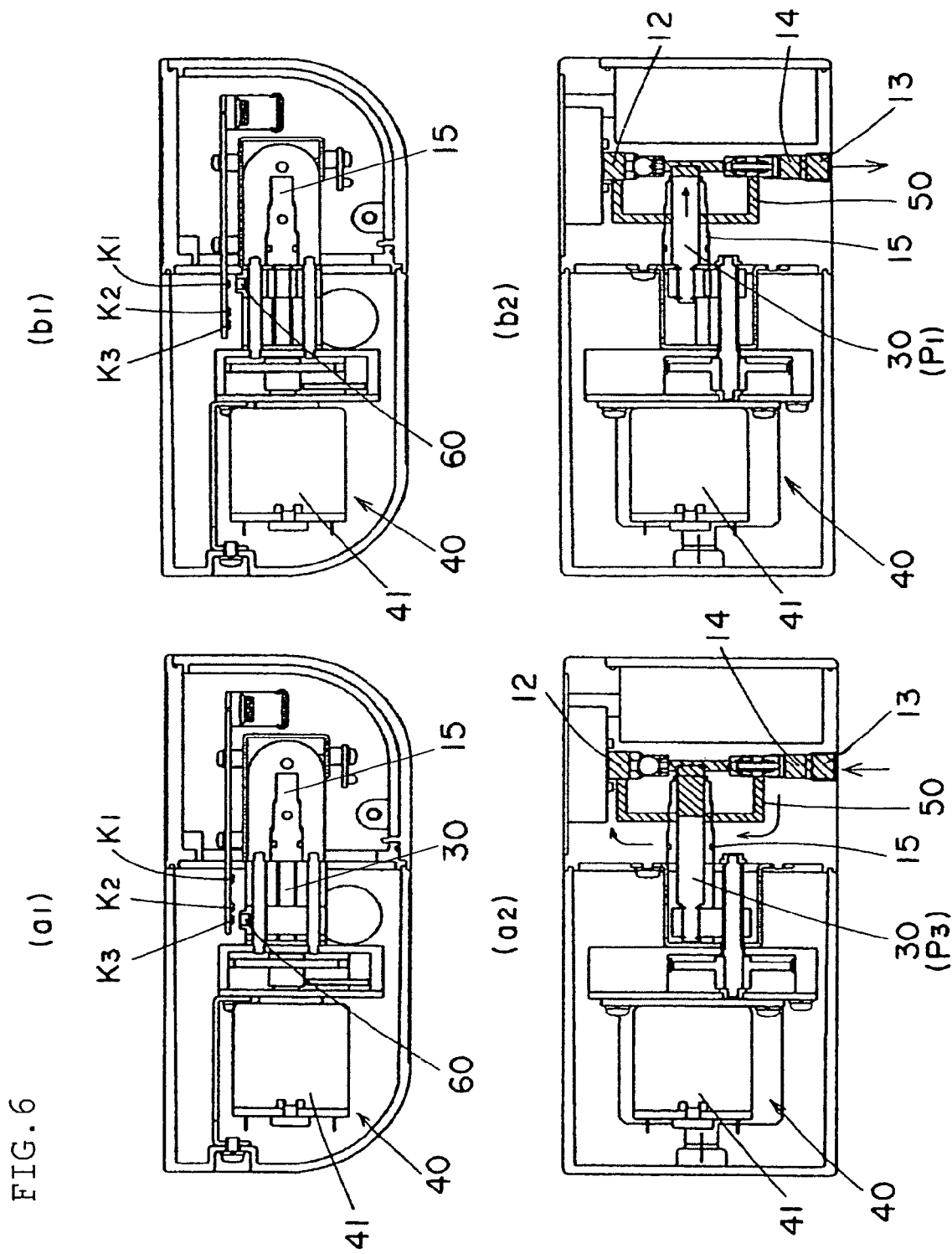
FIGS. 6 (a1), (a2), (b1), and (b2) are views showing the operation of the pump device for lubricant according to the embodiment of the invention.
Figure 7:
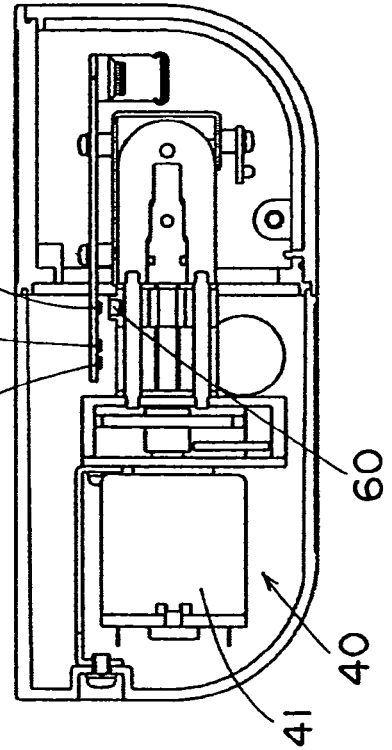
FIGS. 7 (a1), (a2), (b1), and (b2) are views showing the operation of the pump device for lubricant according to the embodiment of the invention.
Figure 7:
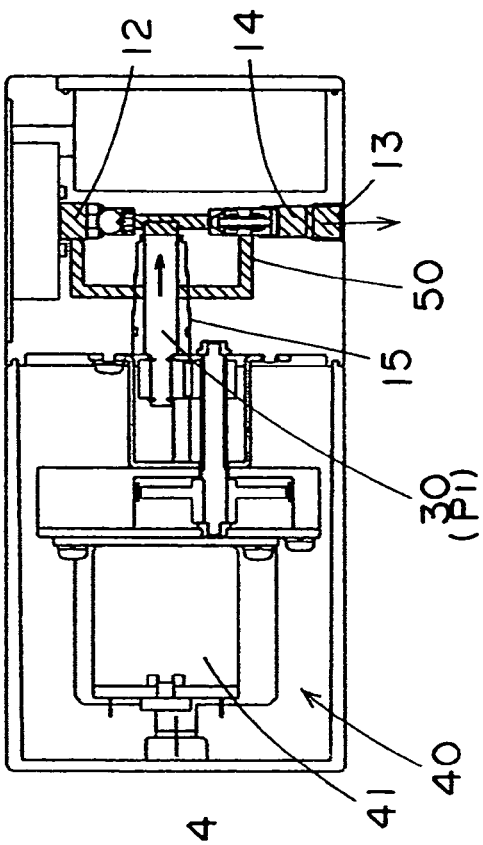
Figure 7:
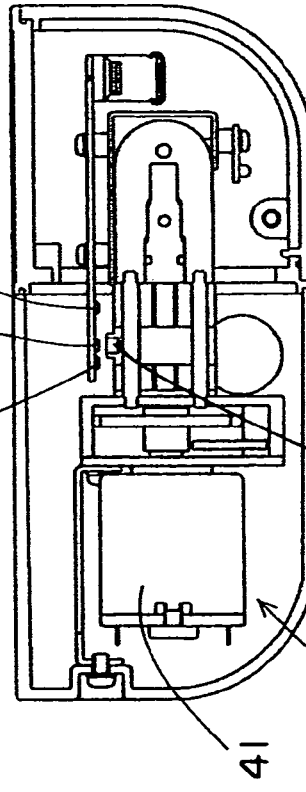
Figure 7:
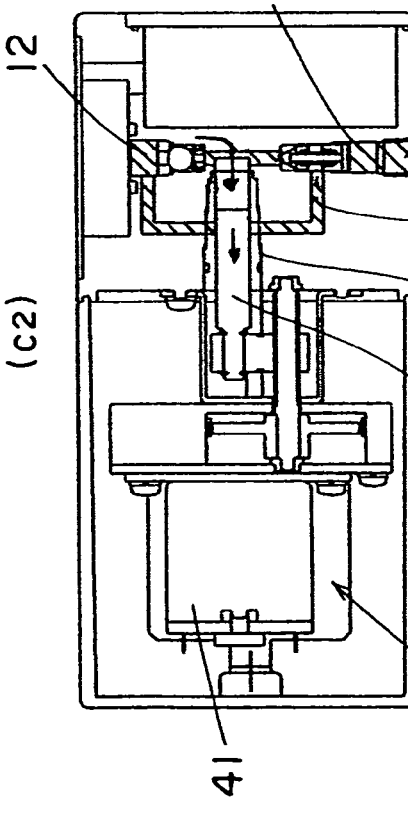
Figure 8:
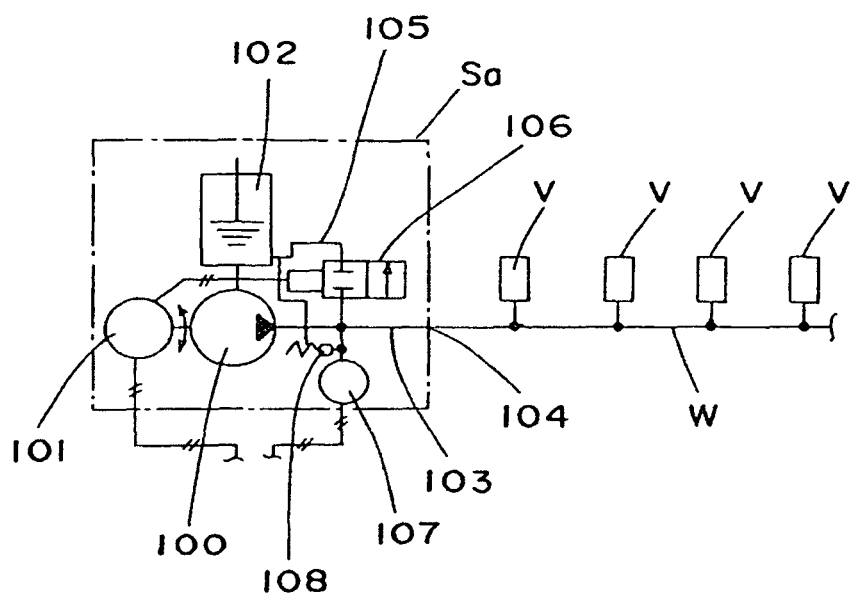
FIG. 8 is a view showing one example of the conventional pump device for lubricant.

The piston 30 can move to the 1st position P1 which is the moving end of the front 32 of the piston 30 which moves forward and discharges lubricant (FIGS. 6 (b1 and (b2), FIGS. 7 (d1) and (d2)), moves backward from the 1st position to the 2nd position (FIGS. 2 (a), (b) FIGS. 7 (c1) and (c2)) at which lubricant is suctioned and further moves backward from the 2nd position P2 to the 3rd position P3 (FIG.1, FIG.3, FIGS. 6 (a1) and (a2)). In the pump main body 10, a decompression path 50 is formed which is blocked when the piston 30 is moved between the 1st position P1 and the 2nd position P2, and opened when the piston 30 moves backward to the $3^{rd}$ position P3. Due to such a configuration, at the time when supply of lubricant to the lubrication pipeline W is stopped, the piston 30 is moved backward to the 3rd position P3, thus enabling the discharge port 13 is decompressed.

Specifically, as shown in FIGS. 1 to 3, in the cylinder part 15 of the pump main body 10, a $1^{st}$ opening 51 and a $2^{nd}$ opening 52 are formed. The $1^{st}$ opening 51 and the $2^{nd}$ opening 52 are, when the piston 30 moves between the $1^{st}$ position P1 and the $2^{nd}$ position P2, blocked by the piston 30, and are opened when the piston 30 moves backward to the $3^{rd}$ position P3. Further, in the pump main body 10, a $1^{st}$ path 53 which connects with the $1^{st}$ opening 51 and the discharge path 14 and a $2^{nd}$ path 54 which connects with the $2^{nd}$ opening 52 and the suction path 12 are formed. Due to such a configuration, when the piston 30 is allowed to move back to the $3^{rd}$ position P3, the decompression path 50 which reaches the suction path 12 after passing the discharge path 14, the $1^{st}$ path 53, the cylinder part 15 and the $2^{nd}$ path 54 is formed.

Further, as shown in FIGS. 2 (a), (b), 6 (a1), (a2), (b1), (b2) and 7 (a1), (a2), (b1), (b2), this device S is provided with a 1st detection part K1 which detects that the piston 30 is positioned at the 1st position P1, a 2nd detection part K2 which detects that the piston 30 is positioned at the 2nd position P2, and a 3rd detection part K3 which detects that the piston 30 is positioned at the 3rd position P3. A magnet 60 (FIG. 2(a)) is formed in a linking member 47 of the actuator 40, and the 1st detection part K1, the 2nd detection part K2 and the 3rd detection part K3 each consists of a hall device 61 which detects the magnet 60 provided in the linking member 47. To the pump main body 10, a bar-like supporting member 62 which extends in the moving direction of the piston 30 is fixed, and the hall device 61 is sequentially attached to the predetermined positions of this support member 62.

The control part 70 (FIG. 1) is provided with a driving control means which drives and controls the actuator 40. The driving control means, at the time when lubricant is supplied, drives and controls the electric motor 41 of the actuator 40 such that the piston 30 to move from the $3^{nd}$ position P3 to the $1^{st}$ position P1, allows the piston to move back and forth between the $1^{st}$ position P1 and the $2^{nd}$ position P2, and the piston 30 is allowed to move to the $3^{rd}$ position P3 at the time when no lubricant is supplied based on the start command signals, detection signals from the $1^{st}$ detection part K1, the $2^{nd}$ detection part K2 and the $3^{rd}$ detection part K3 and stop command signals.

Specifically, control of the actuator 40 by the electric motor 41 by the driving and control means is realized by a function such as a CPU and is conducted as follows. When start command signals are output, power is turned on to allow the electric motor 41 to rotate clockwise to allow the piston 30 to move forward. When the $1^{st}$ detection part K1 detects, the electric motor 41 is stopped for a prescribed period of stopping time, and after the lapse of this prescribed stopping time, the electric motor 41 is allowed to rotate counterclockwise to allow the piston 30 to move backward. When the $2^{nd}$ detection part K2 detects, the electric motor 41 is stopped for a prescribed period of stopping time, and after the lapse of this prescribed stopping time, the electric motor 41 is allowed to rotate clockwise to allow the piston 30 to move forward. Until the stop command signals are output, the electric motor 41 is stopped for a prescribed period of stopping time based on the detection by the $1^{st}$ detection part K1 and the $2^{nd}$ detection part K2. Thereafter; the electric motor is allowed to rotate clockwise or counterclockwise to allow the piston 30 to move back and forth between the $1^{st}$ position P1 and the $2^{nd}$ position P2. When the stop command signals are output, the electric motor 41 is allowed to rotate counterclockwise to allow the piston 30 to move backward to the $3^{rd}$ position P3. Based on the detection by the $3^{rd}$ detection part K3, the power is turned off to allow the piston 30 to stop.

The predetermined stopping time of the electric motor 41 is set to 0.1 to 1.0 second, for example. In the embodiment, the stopping time is set to 0.2 second.

When switching between the clockwise rotation and the counterclockwise rotation, the electric motor 41 is stopped for a prescribed period of stopping time. Therefore, since no sudden switching of rotation is conducted, load imposed on the motor is decreased, whereby the service life thereof can be significantly prolonged.

As for the start command signals, any signal may be used. For example, signals from a timer which sets the intermitting time of this device, or counting signals, for example, from the machine to which the device is attached, signals based on load current or the like may be used.

Stop command signals are sent when the load current of the electric motor 41 becomes a prescribed load current value as a result of the detection of the load current of the electric motor 41, for example. The load current of the electric motor 41 changes according to the pressure of the lubricant pipeline W. Since the pressure of the lubrication pipeline W goes up and the load current increases when the operation of the valve V completes, it is effective to detect the predetermined load current at this time, and to send stop command signals. Moreover, it is also effective to send stop command signals when a pressure detector or the like to detect the pressure of lubricant pipeline W.

Further, the control part 70 has a function of monitoring the remaining amount of lubricant in the tank 2, and if the amount is equal to or smaller than the predetermined amount, stopping the electric motor 41 and issuing a warning. In addition, it may have appropriate control functions such as functions of enabling manual operation of the electric motor 41.

Figure 5:
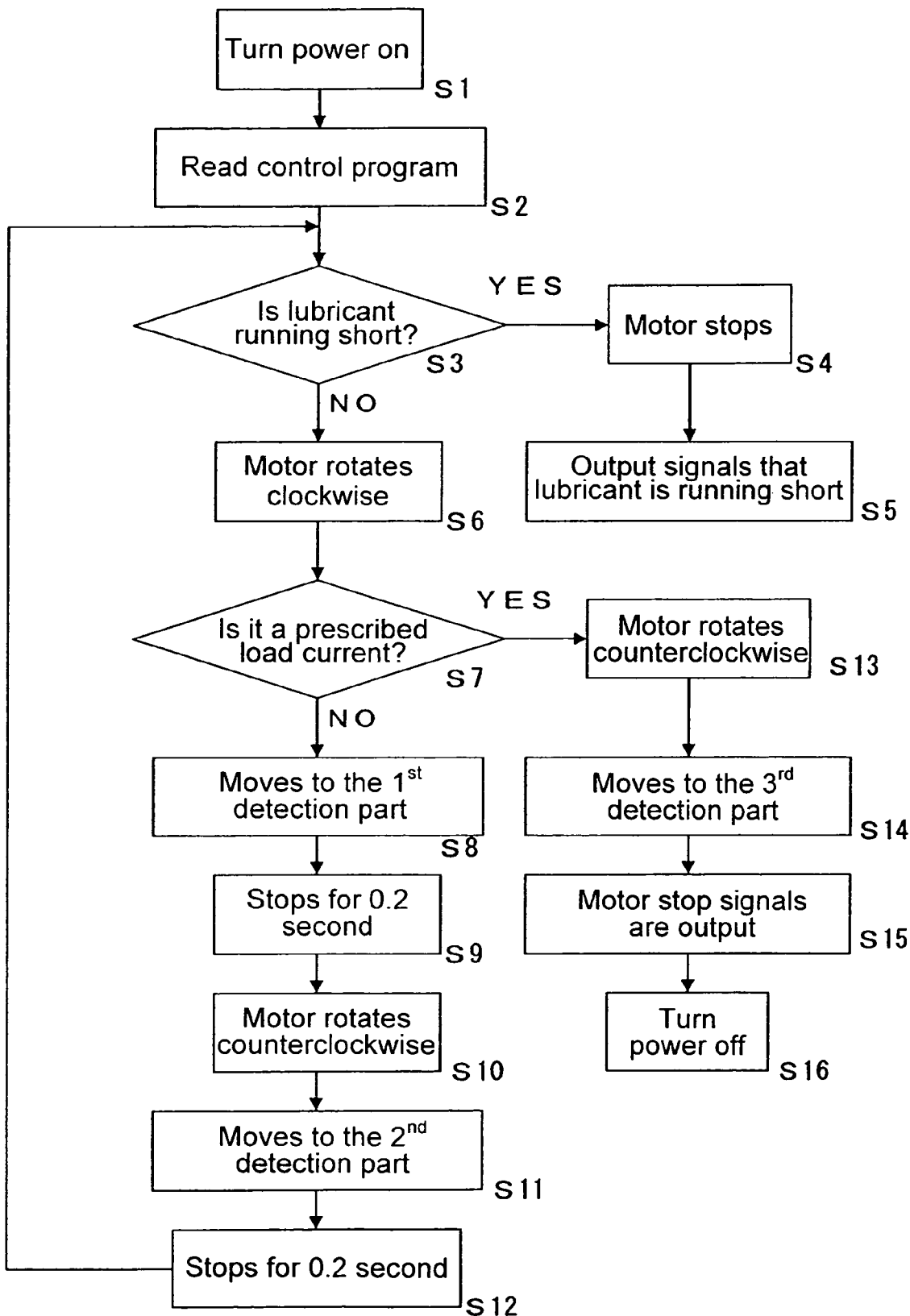
FIG. 5 is a flow chart showing the control by the control part of the pump device of lubricant according to the embodiment of the invention.

Therefore, according to the lubrication system using the pump device S for lubricant according this embodiment, the device operates as follows. An explanation will be made based on the flow chart shown in FIG. 5 and operational views shown in FIGS. 6 (*a*1), (*a*2), (*b*1), and (*b*2) and 7 (*a*1), (*a*2), (*b*1), and (*b*2).

If start command signals are output, a control part 7Q turns power on (Si) and reads the control program to start the control (S2). First, the remaining amount of lubricant is detected (S3). If the remaining amount of lubricant is equal to smaller than the predetermined level (lubricant (grease) is running short) (S3, YES), the electric motor 41 stops (S4), and alarm signals (lubricant (grease) shortage signals) are sent (S5) to allow a warning lamp or the like to turn on (S5).

If the remaining amount of lubricant is not equal to or smaller than the predetermined level (lubricant (grease) is not running short) (S3, NO), the electric motor 41 is allowed to rotate clockwise (S6). As shown in FIGS. 6 (*a*1) and (*a*2), the piston 30 is allowed to move forward from the 3rd position P3 to the 1st position P1. At this time, the control part 70 detects load current of the electric motor 41 and monitors if it is equal to or larger than the predetermined load current or not (S7). If it judges that it is not equal to or larger than the predetermined load current (S7, NO), as shown in FIGS. 6 (*b*1) and (*b*2), the electric motor 41 is allowed to rotate clockwise to allow the piston 30 to move forward until the 1st detection part K1 detects. Then, if the 1st detection part K1 detects (S8), after the electric motor 41 is stopped for a prescribed period of time (0.2 second in the embodiment) (S9), the electric motor 41 is allowed to rotate counterclockwise (S10), and as shown in FIGS. 7 (*c*1) and (*c*2), the electric motor 41 is allowed to rotate counterclockwise to allow the piston 30 to move backward until the 2nd detection part K2 detects. Thereafter, if the 2nd detection part K2 detects (S11), after the electric motor 41 stops for a prescribed stopping time (0.2second, in this embodiment) (S12), the remaining amount of lubricant is detected again (S3), as shown in FIGS. 7 (*c*1) and (*c*2), the electric motor 41 is rotated clockwise (S6). Then, it judges if the load current of the electric motor 41 is equal to or larger than the prescribed load current (S7), the electric motor 41 is allowed to rotate clockwise as mentioned above until it judges that if it is equal to or larger than the prescribed load current (S8 and S9). Thereafter, the electric motor 41 is allowed to rotate counterclockwise (S10, S11, S12). This process is repeated.

Namely, at the time of supplying lubricant to the lubrication pipeline W connected to the discharge port 13 of the main pump body 10, the piston 30 is allowed to move forward to the 1st position P1 FIGS. 6 (*b*1) and (*b*2)) from the 3rd position P3 (FIG. 1, FIG. 3 and FIGS. 6 (*a*1) and (*a*2)) by means of the actuator 40. Then, when the piston reaches the 1st position P1 (FIGs. 6 (*b*1) and (*b*2)), the piston 30 is allowed to move backward, and when the piston reaches the 2nd position P2 (FIGS. 2 (*a*), (*b*), FIGs. 7 (*c*1) and (*c*2)), the piston 30 is again allowed to move forward. If the piston reaches the 1st position P1 (FIGs. 7 (*d*1) and (d2)), the piston 30 is allowed to move backward again. If the piston 30 reaches the 2nd position P2 (FIGS. 2 (*a*), (*b*), FIGs. 7 (*c*1) and (*c*2)), the piston 30 is allowed to move forward again. In this way, the piston 30 moves back and forth between the 1st position P1 and the 2nd position P2. In this case, as shown FIGS. 2 (*a*), (*b*), since the decompression path 50 is blocked by the piston 30, lubricant stored in the tank 2 is suctioned by the piston 30 by the back-and-forth operation of this piston 30, discharged from the discharge port 13 and supplied to the lubrication pipeline W. Due to the supply of lubricant, lubricant is discharged from the valve V provided in the lubrication pipeline W, whereby supply of lubricant is performed.

Since the pressure of the lubrication pipeline W is elevated and load current is increased if lubricant is discharged from the valve V, a predetermined load current is detected at this time. That is, the control part 70 detects the load current of the electric motor 41 and monitors whether it is equal to or larger than the predetermined load current (S7). If it judges that it is equal to or larger than the load current (S7, YES), as shown in FIG. 1, FIG. 3, and FIGS. 6 (*a*1) and (*a*2), the electric motor 41 is allowed to rotate counterclockwise until the 3rd detection part K3 detects (S13) to allow the piston 30 to move backward. If the 3rd detection part K3 (S14), stop command signals of the electric motor 41 are output (S15), thereby turning the power of the electric motor 41 off (S16).

In this case, since the decompression path 5Q is opened by the piston 30 as shown in FIG. 1, FIG. 3, and FIGs. 6 (*a*1) and (*a*2), the discharge port 13 is decompressed, and the lubrication pipeline W can be ready for the subsequent oil supply. Until the subsequent start command signals are output, the piston 30 is in the stand-by state. If start command signals are output, the piston 30 is operated in the manner as mentioned above. That is, lubricant can be supplied intermittently.

In the pump device S for lubricant according to the embodiment, since supply of lubricant and decompression at the time of stopping of supply can be performed only by the back-and-forth movement of the piston 30 by the actuator 40. The cylinder part 15 and the piston 30 which suction and discharge lubricant have come to serve as a decompression valve. Therefore, unlike conventional pump devides, it is unnecessary to prepare a decompression valve separately. In addition, a driving mechanism may be a simple mechanism which allows the piston 30 to move forward and backward by means of the actuator 40. Therefore, the structure is simple, and as a result, the device can be downsized, leading to a reduction in cost.

During the operation of the piston 30, by detecting the position of the piston 30 by the $1^{st}$ detection part K1, the $2^{nd}$ detection part K2 and the $3^{rd}$ detection part K3, the back-and-forth movement of the piston 30 is controlled, whereby operation can be conducted without fail. In this case, each of the $1^{st}$ detection part K1, the $2^{nd}$ detection part K2 and the $3^{rd}$ detection part K3 consists of the hall device 61 which detects the magnet 60 provided at the side of the piston 30. Therefore, a detection mechanism can be configured by a simple means, which results in a simple configuration.

Further, the actuator 40 is provided with a screw shaft 45 which is rotated clockwise and counterclockwise by the electric motor 41 which can be rotated clockwise and counterclockwise. The rotation of this screw shaft 45 is transmitted to the piston 30 through a linking member 47, and hence, the piston 30 can be forcibly moved forward and backward. As a result, the piston 30 can be operated without fail, and supply of lubricant can be surely conducted without being affected by a change in viscosity of lubricant. Further, the introduction port 16 and the derivation port 17 of the cylinder part 15 are formed at the front end part 15b of the cylinder part 15. As compared with the case where the introduction port 16 is provided in the midway of the cylinder part 15, a negative pressure caused by pulling back of the piston 30 immediately acts on the introduction port 16. Lubricant can be suctioned smoothly without being affected by a change in viscosity of lubricant.

In the pump device S for lubricant according to the above-mentioned embodiment, the actuator 40 is configured to have the electric motor 41 and the screw shaft mechanism 45. The configuration is not necessarily limited thereto. Other mechanisms such as the cylinder device, an air cylinder, for example, may be used. That is, the configuration may be changed appropriately. Moreover, in the pump device S for lubricant according to the above-mentioned embodiment, the $1^{st}$ detection part K1, the $2^{nd}$ detection part K2, and the $3^{rd}$ detection part K3 are each formed of the hall device 61 which detects the magnet 60 provided in the linking member 47. The configuration is not limited thereto. The detection part may be configured by using a limit switch, an optical sensor or the like, and may be changed appropriately.

Furthermore, the type of lubricant used is not limited to grease and oil can also be used. It is needless to say that the pump device S for lubricant according to the above-mentioned embodiment can be applied not only to an injection molding machine but also to a lubrication system provided in various machines such as a lathe.

Although only some exemplary embodiments and/or examples of this invention have been described in detail above, those skilled in the art will readily appreciate that many modifications are possible in the exemplary embodiments and/or examples without materially departing from the novel teachings and advantages of this invention. Accordingly, all such modifications are intended to be included within the scope of this invention.

The documents described in the specification are incorporated herein by reference in its entirety.

The invention claimed is:

1. A pump device for lubricant comprising:
   a tank for storing lubricant;
   a block-shaped pump main body provided with a suction port, a suction path along which the lubricant stored in the tank is suctioned from the suction port, a discharge port, and a discharge path along which the suctioned lubricant is discharged from the discharge port;
   a cylinder part provided with an introduction port which is formed in the pump main body and is intercommunicated with the suction path and introduces the lubricant from the suction path, and a derivation port which is intercommunicated with the discharge path and leads the lubricant to the discharge path;
   a piston which is inserted into the cylinder part to move forward and backward within the cylinder part, and arranged to suction the lubricant from the introduction port when moved backward and discharge the lubricant from the derivation port when moved forward;
   an actuator which allows the piston to move forward to a 1st position at which the lubricant is discharged from the derivation port, move backward from the 1st position to a 2nd position at which the lubricant is suctioned from the introduction port and further move backward from the 2nd position to a 3rd position at which the suction and discharge of the lubricant is stopped;
   a driving control device which drives and controls the actuator such that when the lubricant is supplied, the piston is allowed to move from the 3rd position to the 1st position and allowed to move between the 1st position and the 2nd position, and when the lubricant is not supplied, the piston is allowed to move to the 3rd position and stop;
   a 1st detection part which detects that the piston is positioned at the 1st position;
   a 2nd detection part which detects that the piston is positioned at the 2nd position; and
   a 3rd detection part which detects that the piston is positioned at the 3rd position;
   wherein the driving control device drives and controls the actuator based on each of start command signals, detection signals from the 1st detection part, the 2nd detection part and the 3rd detection part, and stop command signals,
   the cylinder part of the pump main body is formed with a 1st opening and a 2nd opening which are blocked when the piston moves between the 1st position and the 2nd position and is opened when the piston is allowed to move back to the 3rd position and
   the pump main body is formed with a 1st path which connects the 1st opening and the discharge path a 2nd path which connects the 2nd opening and the suction path, and a decompression path which reaches the suction path after passing the discharge path, the 1st path, the cylinder part and the 2nd path when the piston is allowed to move backward to the 3rd position.

2. The pump device for lubricant according to claim 1, wherein the driving control device controls the actuator to allow the piston to move forward when the start command signals are output, allow the piston to move backward based on the detection by the 1st detection part, allow the piston to move forward based on the detection by the 2nd detection part, allow the piston to move back and forth between the 1st position and the 2nd position until the stop command signals are output based on the detection by the 1st detection part and the 2nd detection part, allow the piston to move backward to the 3rd position when the stop command signals are output, and allow the piston to stop based on the detection by the 3rd detection part.

3. The pump device for lubricant according to claim 2, wherein the 1st detection part, the 2nd detection part and the 3rd detection part each consist of a Hall effect device which detects a magnet provided on the side of the piston.

4. The pump device for lubricant according to claim 1, wherein the actuator comprises an electric motor which rotates clockwise and counterclockwise, a screw shaft which is allowed to rotate clockwise or counterclockwise by the electric motor, and a linking member which is screwed to the screw shaft and is linked to the piston and moves forward and backward by the clockwise or counterclockwise rotation of the screw shaft to allow the piston to move forward and backward.

5. The pump device for lubricant according to claim 4, wherein the driving control device controls the actuator to allow the electric motor to rotate clockwise to move the piston forward when the start command signals are output, allow the electric motor to stop for a prescribed period of stopping time when the 1st detection part detects, allow the electric motor to rotate counterclockwise to move the piston backward after the lapse of the prescribed period of stopping time, allow the electric motor to stop for a prescribed period of stopping time when the 2nd detection part detects, allow the electric motor to rotate clockwise to move the piston forward after the lapse of the prescribed period of stopping time, allow the electric motor to stop for the prescribed period of stopping time based on the detection of the 1st detection part and the 2nd detection part and thereafter allow the electric motor to rotate clockwise or counterclockwise to move the piston back and forth between the 1st position and the 2nd position until the stop command signals are output, and allow the electric motor to rotate counterclockwise to move the piston backward to the 3rd position when the stop command signals are output, and stop the piston based on the detection of the 3rd detection part.

6. The pump device for lubricant according to claim 1, wherein the introduction port and the derivation port of the cylinder part are formed at a front end part of the cylinder part, an inlet check valve which only permits suction is provided at a front side of the introduction part and an outlet check valve which only permits discharge is provided at a rear side of the derivation port.

* * * * *